United States Patent [19]
Janai

[11] Patent Number: 5,367,392
[45] Date of Patent: Nov. 22, 1994

[54] ACTIVE MATRIX DISPLAY PANEL HAVING CONNECTABLE SECONDARY SWITCHES

[75] Inventor: Meir I. Janai, Haifa, Israel

[73] Assignee: Quick Technologies Ltd., Haifa, Israel

[21] Appl. No.: 32,013

[22] Filed: Mar. 16, 1993

[30] Foreign Application Priority Data

Oct. 27, 1992 [IL] Israel ............................. 103566

[51] Int. Cl.$^5$ ..................... G02F 1/133; H01L 27/10
[52] U.S. Cl. ........................ 359/59; 359/58; 257/72; 257/530
[58] Field of Search .............. 359/58, 59, 60, 79; 345/93; 257/59, 72, 365, 646, 649, 529, 530

[56] References Cited

U.S. PATENT DOCUMENTS

| | | | |
|---|---|---|---|
| 4,513,310 | 4/1985 | Ohno et al. | 257/530 |
| 4,890,097 | 12/1989 | Yamashita et al. | 359/59 |
| 4,907,861 | 3/1990 | Muto | 359/59 |
| 4,916,809 | 4/1990 | Boudou et al. | 257/530 |
| 5,062,690 | 11/1991 | Whetten | 359/59 |
| 5,151,807 | 9/1992 | Katayama et al. | 359/59 |
| 5,164,851 | 11/1992 | Kanemori et al. | 359/59 |
| 5,241,212 | 8/1993 | Motonami et al. | 257/529 |
| 5,260,818 | 11/1993 | Wu | 359/59 |

OTHER PUBLICATIONS

F. J. Henley, "Early Detection and Repair of AMLCD Defects", Solid State Technology, Apr. 1992, pp. 65–68.

*Primary Examiner*—William L. Sikes
*Assistant Examiner*—Tai V. Duong
*Attorney, Agent, or Firm*—Browdy and Neimark

[57] ABSTRACT

An active matrix of a display panel having a plurality of array elements and at least two data busses, each array element including a primary switch initially connected to the data busses and at least one connectable secondary switch, wherein, when the primary switch is disconnected from the busses, one of the at least one secondary switches is connected to the busses.

10 Claims, 7 Drawing Sheets

ACTIVE MATRIX DISPLAY PANEL HAVING CONNECTABLE SECONDARY SWITCHES

FIELD OF THE INVENTION

The present invention relates to the production of Active Matrix Liquid Crystal Display (AMLCD) panels generally and to the production of AMLCD panels which can be relatively easily repaired in particular.

BACKGROUND OF THE INVENTION

AMLCD panels are typically utilized as screens of monitors, typically for laptop and smaller personal computers, as pocket televisions and as displays of other types of systems, such as for avionic displays. Future applications may include home televisions.

A portion of a typical AMLCD panel is illustrated in FIGS. 1A-1D. The AMLCD panel is a two-dimensional array of switches 10, each connected to an LCD pixel, all fabricated onto a base plate. The switches are typically thin film transistors (TFTs) made of polysilicon, amorphous silicon or cadmium selenide. Each switch 10 has gate and source electrodes 11 and 13, which are accessed by gate and source signal busses 12 and 14, respectively. The gate and source busses 12 and 14 are activated by scan and data drivers, respectively, and are arranged in a row and column geometry as shown in FIGS. 1A and 1B. Each switch 10 also has a drain electrode 16 to which is connected an electrode 18 of a LCD pixel. The electrode 18 typically is mostly square, with a step 21 cut out in the upper left corner. Step 21 is typically just large enough to accommodate switch 10 and its associated elements.

FIGS. 1C and 1D illustrate an enlarged section of the switch 10, in top view and cross-section, respectively, for a gate-down TFT design. Typically, the switch 10 comprises an insulator 24 typically made of silicon nitrite and a semiconductor 26 formed of intrinsic amorphous silicon covered by an n type amorphous silicon 0.3 micrometers thick. The source and gate electrodes 11 and 13 are formed of aluminum and the drain electrode 16 is formed of indium-tin-oxide. Typically the switch 10 and its associated elements are deposited on a glass plate 28.

A finished AMLCD panel includes many layers placed over the active matrix shown in FIGS. 1A-1D. Typically, over the active matrix a liquid crystal layer is placed, over which are placed a grid layer, a filter layer, a polarizer layer and a cover layer. It is noted that the additional layers are all transparent to light.

A high definition color display may contain 1024 columns per color and about 700 rows, providing an AMLCD panel of 2,150,400 switches. Producing such an array of transistors on a glass plate 28 of about 20×15 square inches, without a defect, is formidably difficult. Some defects are to be expected and thus, a repair methodology is typically provided with the manufacturing process.

Designing for redundancy in order to repair microelectronic memory circuits was described as early as 1972 by S. E. Schuster in *The IBM Technical Disclosure Bulletin*, Vol. 15 (2), 1972, p. 571. A key feature of the design method described therein is that a small number of spare cells are manufactured at the bottom of the array, or at some other location outside of the main array locations. The number of spare cells should correspond to the expected number of defects in the array and is typically a fairly small percentage of the total number of cells in the array. When a defect in the main array is located, the defective rows are isolated and the spares are activated via laser cutting.

The design methodology described by S. E. Schuster cannot be applied to AMLCD panels because spare cells at a remote location cannot compensate for a visual defect existing somewhere within the main array. Thus, each spare cell must be at the location of the defective cell.

Repair methodologies have been proposed for AMLCD panels. A common denominator of these methods is that a defective cell is not usually repaired; rather, it is isolated so that it does not effect the overall appearance of the display. For example, if the source and drain electrodes of a given cell are shorted, a defective column is produced which appears as a bright or dark vertical line on the screen. Such a cell cannot be repaired. However, if the source electrode 13 of the defective cell is cut from the source bus 14, the defect can be isolated to a single cell and, because of the small size of a single cell of the array, the defect may not be apparent.

The methodology described hereinabove is acceptable for second-quality products. However, consumers expect high quality products to be free from defects. For some applications, such as for avionic displays, no defects are acceptable.

The defect can also be locally repaired. For example, a break in a metal line can be repaired by depositing metal locally over the break via laser beam or ion beam induced chemical vapor deposition. Repair of a short between two metal lines can be achieved by ablating the metal bridge with a laser. Such a system is described by J. Henley in *Solid State Technology*, Vol. 35, April 1992, pp. 65-68.

Local defect repair methodologies require identification of the exact, microscopic location of the defect. It is not sufficient to identify the location of the defective cell; rather, the location of the defect within the cell must be determined. While the cell size is typically $100 \times 100$ $\mu m^2$, the defect size may be $1 \times 1$ $\mu m^2$. Hence, the imaging resolution required for local defect repair is at least a hundred times more than that needed to detect a defective cell. There is also a corresponding increase in detection time and repair cost.

SUMMARY OF THE INVENTION

The present invention seeks to provide an AMLCD design in which any defective cell can be repaired, without a significant increase in production cost or complexity. The machinery needed to perform the repairs is also described.

There is therefore provided, in accordance with a preferred embodiment of the present invention, an active matrix of a display panel having a plurality of array elements and at least two data busses, each array element including a primary switch initially connected to the data busses and at least one connectable secondary switch, wherein, when the primary switch is disconnected from the busses, one of the at least one secondary switches is connected to the busses.

Additionally, in accordance with a preferred embodiment of the present invention, the active matrix includes a fuse between the primary switch and each of the data busses.

Moreover, in accordance with a preferred embodiment of the present invention, the at least one secondary switch is connected to the data busses by normally open links.

Furthermore, in accordance with a preferred embodiment of the present invention, the fuses and links are deactivated and activated with a laser pulse.

Still further, in accordance with a preferred embodiment of the present invention, the primary and at least one secondary switches are formed of thin film transistors. Alternatively, they are formed of metal-insulator-metal switches.

Additionally, in accordance with a preferred embodiment of the present invention, the links comprise an insulator located between two, partially overlapping, metal branches. The insulator is preferably selected from one of the following group: amorphous silicon, silicon nitride, or a combination of silicon nitride and amorphous silicon.

Moreover, in accordance with a preferred embodiment of the present invention, the two metal branches comprise an upper and a lower branch and wherein the upper branch has an opening exposing the insulator.

Further, in accordance with a preferred embodiment of the present invention, the links comprise a thin film connecting two metal strips. The thin film is preferably selected from the following group: polysilicon, amorphous silicon or diamond thin film. Alternatively, the thin film comprises first and second sections of a first polarity between which is a third section of a second polarity, wherein, upon irradiation by a laser, the second polarity of a portion of the third section is changed to the first polarity.

There is also provided, in accordance with a preferred embodiment of the present invention, apparatus for repair of an active matrix, the active matrix being formed of a plurality of elements each having a primary switch connected via fuses and at least one secondary switch connected via links. The apparatus includes a) a laser for providing a laser pulse, b) an optical system for providing to the laser pulse a first energy level for cutting a fuse of the active matrix and a second energy level for activating a link of the active matrix, c) a table on which the active matrix is placed and d) control apparatus for controlling the laser, optical system and table in response to identification of defective elements so as to generally smoothly repair the active matrix.

Additionally, in accordance with a preferred embodiment of the present invention, the apparatus includes apparatus for receiving location information of the defective elements.

Further, in accordance with a preferred embodiment of the present invention, the apparatus includes apparatus for identifying defective elements.

Finally, in accordance with a preferred embodiment of the present invention, the active matrix is a fully finished and encapsulated active matrix display.

BRIEF DESCRIPTION OF THE DRAWINGS

The present invention will be understood and appreciated more fully from the following detailed description taken in conjunction with the drawings in which:

FIG. 1A is a schematic circuit diagram, FIG. 1B is a top view, FIG. 1C is an expanded view of the circular section of FIG. 1B, marked C and FIG. 1D is a side view of the section of FIG. 1C;

FIG. 2A is a circuit diagram and FIG. 2B is an expanded view, similar to that shown in FIG. 1C, but showing the details of the present invention;

DETAILED DESCRIPTION OF PRESENT INVENTION

Reference is now made to FIGS. 2–7 which illustrate a AMLCD, constructed and operative in accordance with the present invention.

Figure 1A:
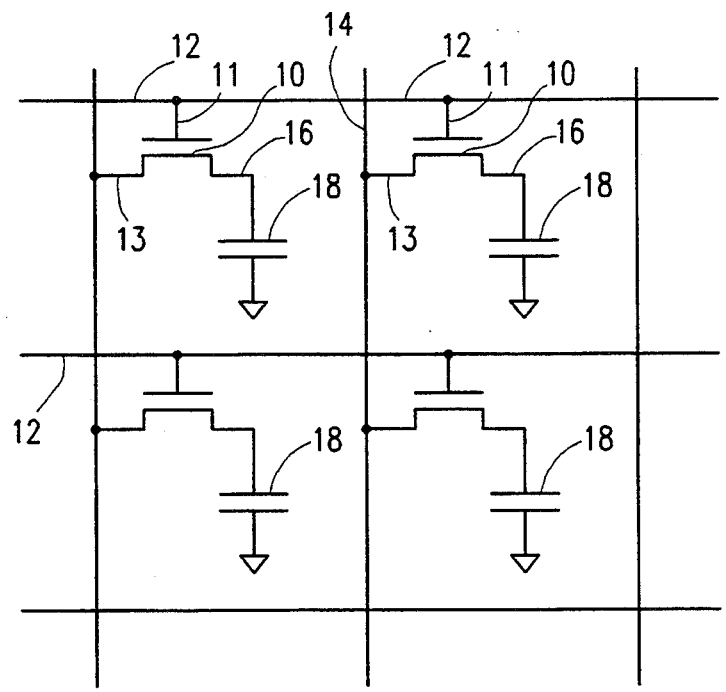
FIGS. 1A–1D are illustrations of a section of a prior art active matrix liquid crystal display (AMLCD) panel, where
Figure 1B:
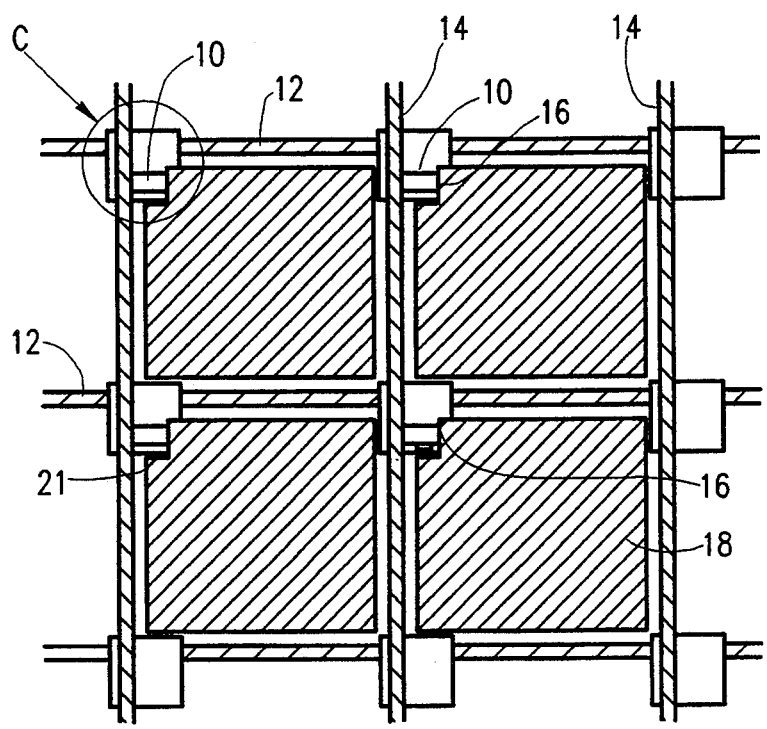
Figure 1C:
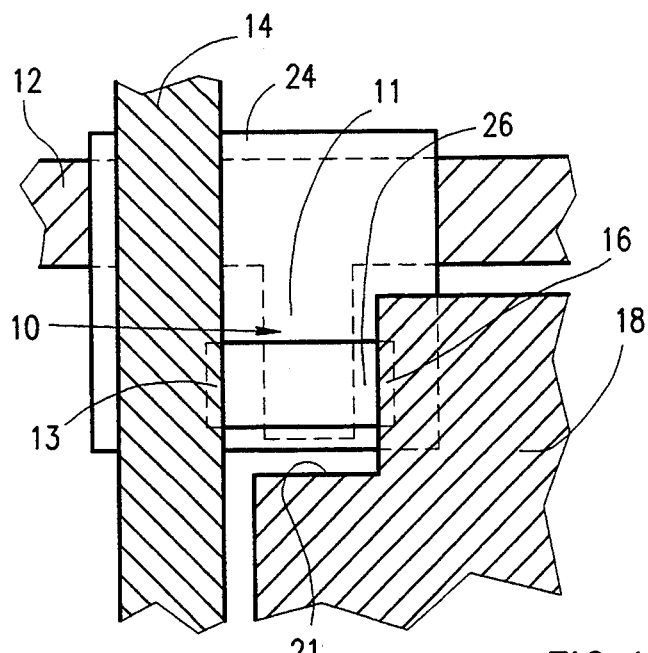
Figure 1D:
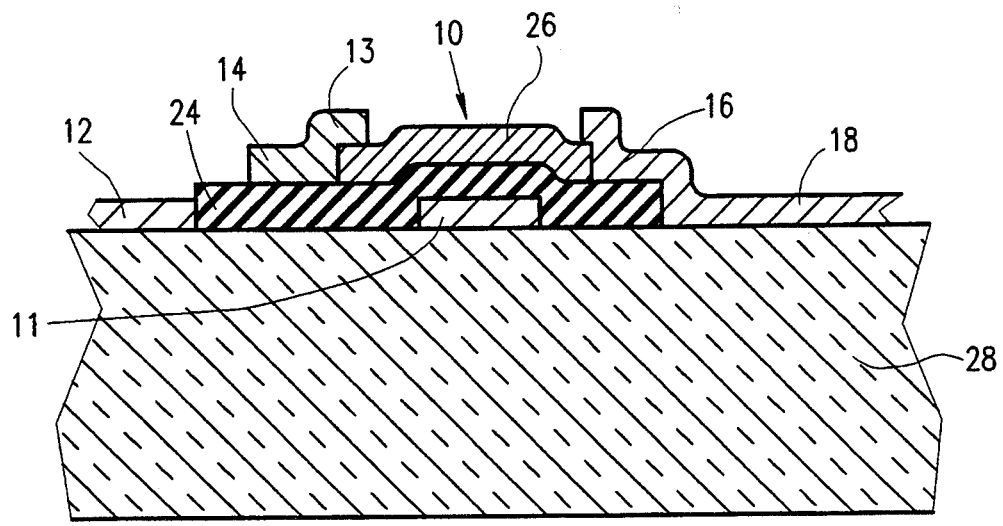
Figure 2A:
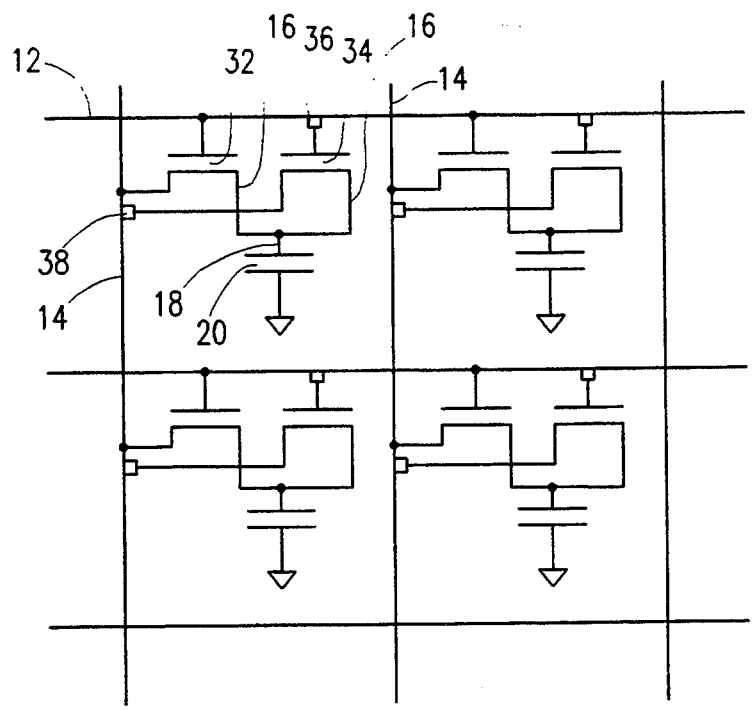
FIGS. 2A and 2B are illustrations of a section of an AMLCD panel constructed and operative in accordance with a preferred embodiment of the present invention, where

FIG. 2A is a schematic circuit diagram of a few array elements of an AMLCD panel of the present invention. Reference numerals are provided to only one of the elements.

Each array element of the AMLCD comprises at least two thin film transistors (switches) 32 and 34 wherein a primary one of the switches, for example switch 32, is connected as in the prior art. The spare switches, such as switch 34, are not connected to the gate and source busses 12 and 14; however, provision for later linking them is available at points 36 and 38, respectively. The drain electrodes 16 of each of switches 32 and 34 are connected to the pixel electrode 18.

It will be appreciated that the AMLCD panel of the present invention is configured such that the spare switches 34 can be connected to the grid of the busses 12 and 14 after testing of the finished panel.

Figure 2B:
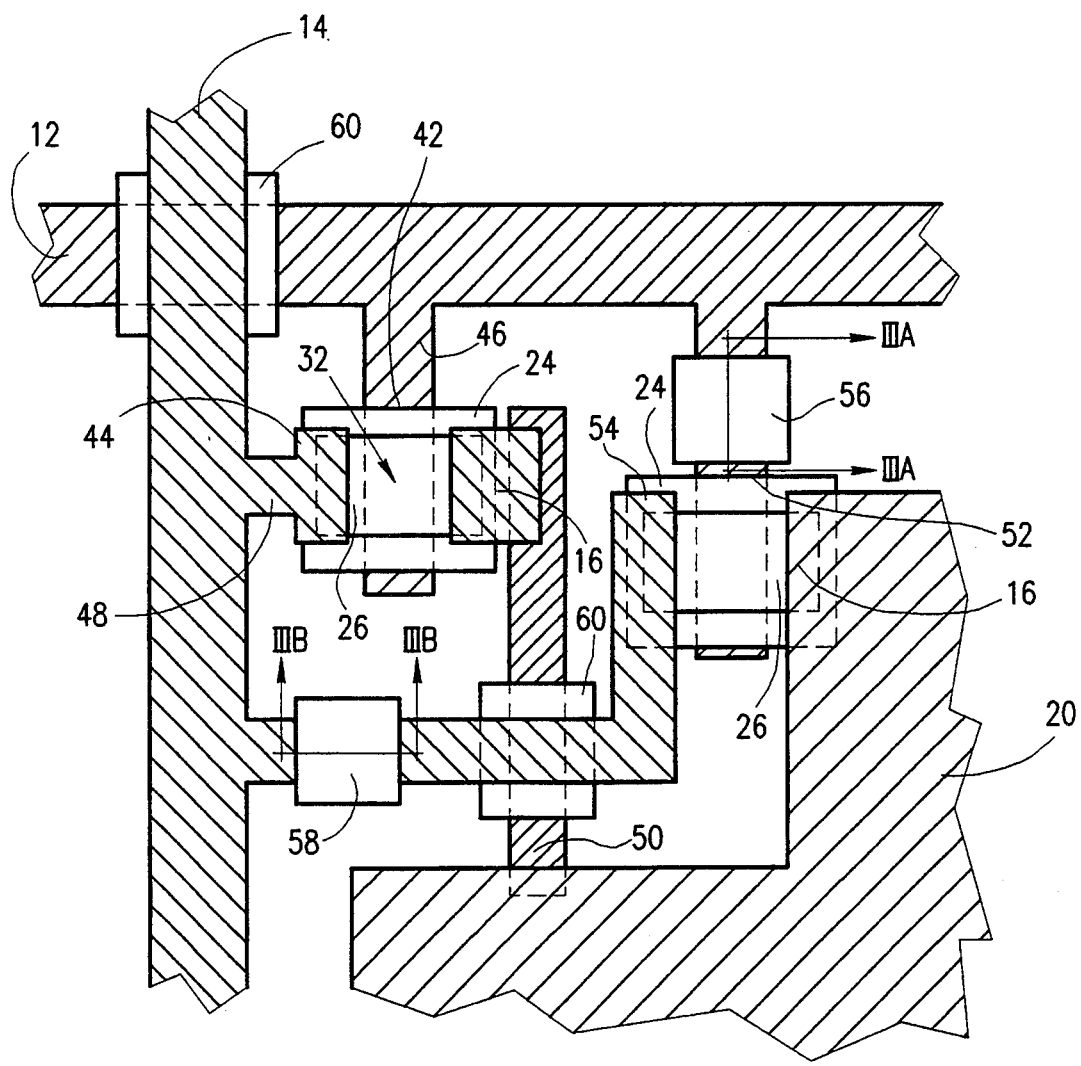

FIG. 2B illustrates a preferred arrangement of the redundant switches 32 and 34. In accordance with the present invention, the gate and source electrodes of switch 32, labeled 42 and 44, respectively, are provided with fuse locations 46 and 48 so that the primary switch 32 can be disconnected from the busses 12 and 14 if so desired. Drain electrode 16 of switch 32 is connected to the pixel electrode 20 via an underpass 50.

The gate and source electrodes of spare switches 34, labeled 52 and 54, respectively, are connected to the respective bus lines 12 and 14 by laser activated links 56 and 58. These links are manufactured in the open state and can be changed to a close state via a laser pulse.

If the panel includes more than one spare switch 34 per array element, then fuses (not shown) are associated with the gate and source electrodes 52 and 54, thereby to enable their disassociation from the busses 12 and 14.

Any locations wherein two conducting metals would overlap are separated by an insulating material, labeled 60. Insulating layers 24 and 60 may be deposited and patterned together, in the same process steps.

It is noted that the step 21 in the present invention is slightly larger than that of the prior art since the present invention has redundant switches.

The laser activated links 56 and 58 can be manufactured in several different configurations; the selected configuration should be compatible with the manufacturing technique of the switches 32 and 34.

FIGS. 3A-7A show several configurations of link 56 and FIGS. 3B-7B show several configurations of link 58. In each configuration, the links comprise a bridging material located between the electrode and its corresponding bus, where the bridging material has properties which change upon application of laser light. Thus, link 56 connects gate bus metal 100 and gate electrode 102 and link 58 connects source electrode metal 104 and source bus metal 106.

Figure 3B:
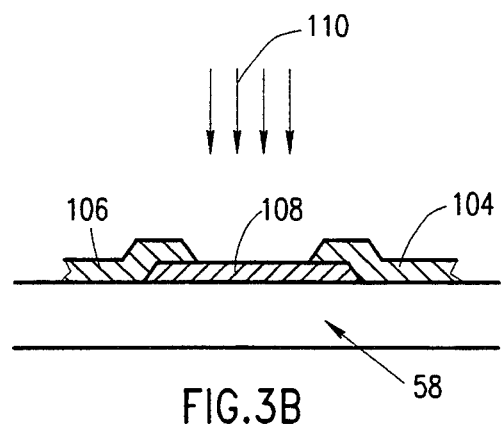
FIGS. 3B, 4B, 5B, 6B and 7B are cross-sectional illustrations along line IIIB—IIIB of FIG. 2B showing the connection of the source electrode for a variety of different embodiments of the present invention.
Figure 3A:
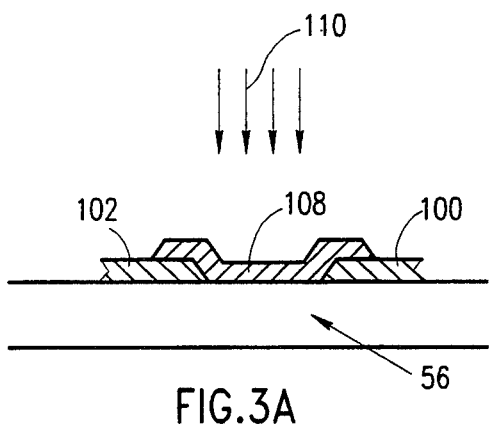
FIGS. 3A, 4A, 5A, 6A and 7A are cross-sectional illustrations along line IIIA—IIIA of FIG. 2B showing the connection of the gate electrode for a variety of different embodiments of the present invention.

FIGS. 3A and 3B illustrate a planar linking configuration. The bridging material, labeled 108, may be amorphous silicon (a-Si) or plasma-enhanced chemical vapor deposited diamond film. If bridging material 108 is of a-Si and is deposited and patterned at the same time as the semiconductor material 26 (FIG. 2B), it usually appears over the gate metals 100 and 102 and under the source metals 104 and 106, as shown.

When a laser pulse 110 is provided to the a-Si, it crystallizes and metal diffuses into the link. The conductivity of the a-Si increases by over 7 orders of magnitude.

If the bridging material 108 is of diamond film, it graphitizes in response to laser pulse 110 and its conductivity increases by over 12 orders of magnitude.

Figure 4B:
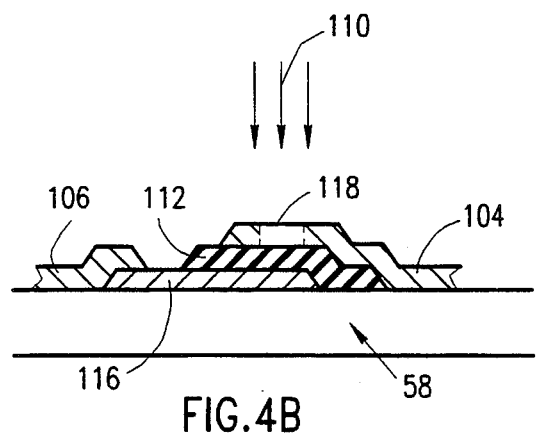
Figure 4A:
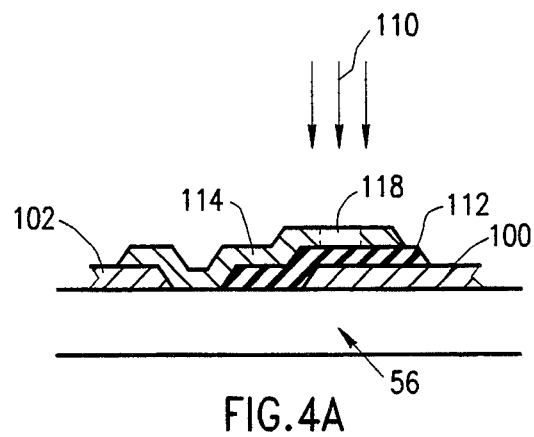

FIGS. 4-6 illustrate various stacked laser activated links. Links 56 and 58 of FIGS. 4A and 4B, are metal sandwiches with an appropriate dielectric material 112, for example, silicon nitride, formed in between the metal layers. The dielectric material 112 is semi-transparent. Such a metal/dielectric/metal switch is described in detail in the article by Bernstein et al in *International Conference on Wafer Scale Integration* (1992), pp. 176-181, which article is incorporated herein by reference. The switch of FIGS. 4A and 4B is particularly useful for AMLCD panels of the metal/insulator/metal design.

For link 56 (FIG. 4A), in the gate-down TFT configuration, the dielectric material 112 is deposited over one of the metal branches, for example, branch 100. A metal cup 114 is patterned over dielectric material 112 at the same time that the source metals 104 and 106 (FIG. 4B) are being deposited and patterned. It is noted that, in the FIGS. 4-6, metals that are deposited at the same time are marked with the same hash marks.

In link 58, a metal pad 116 (FIG. 4B) is deposited and patterned at the same time that the gate metals 100 and 102 (FIG. 4A) are patterned. Thereafter, dielectric material 112 is deposited and patterned after which, the source metal is deposited and patterned into source electrode 104, source bus 106 and metal cup 114 (FIG. 4A).

Typically, the upper layer of the links 56 and 58, which are metal cup 114 and source electrode 104, respectively, have an opening 118 formed in them during patterning. When it is desired to close links 56 and 58, laser pulse 110 is directed at opening 118, which is typically of the diameter of laser pulse 110. This enables local heating of the semi-transparent dielectric material 112 at its interface with the metal 100 (FIG. 4A) or 116 (FIG. 4B) underneath it. This arrangement confines the heat to the activated zone, thereby minimizing thermal losses and avoiding metal splutter of the upper metal 114 (FIG. 4A) or 104 (FIG. 4B).

The dielectric material 112 dissolves under the thermal stress of the laser pulse 110 thereby providing contact between the gate metals 100 and 114 (FIG. 4A) and the source metals 104 and 116 (FIG. 4B).

In the configuration of FIGS. 4A and 4B, a Nd:YAG laser pulse of 2 to 10 $J/cm^2$ is useful.

Figure 5B:
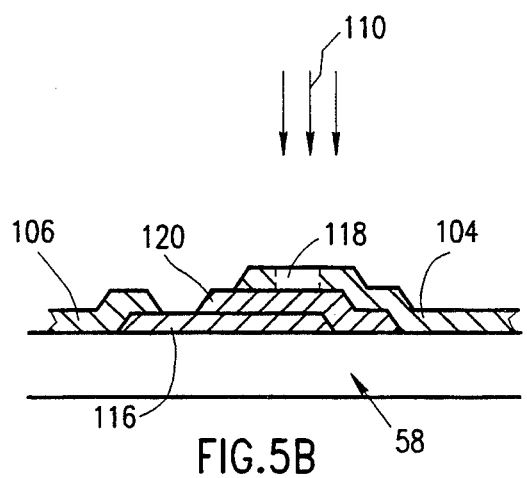
Figure 5A:
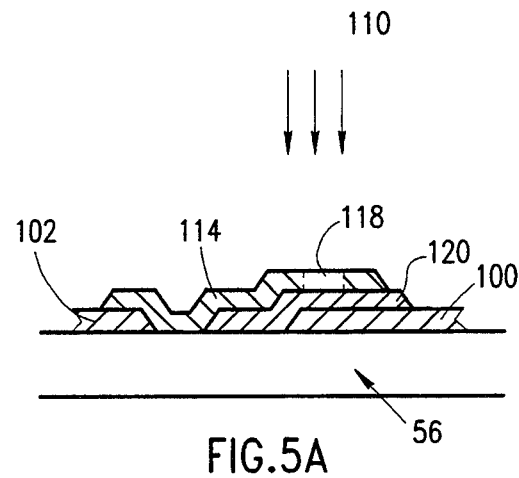

FIGS. 5A and 5B are similar to their corresponding FIGS. 4A and 4B with the exception that the bridging material, labeled 120, is of amorphous silicon. This configuration is similar to ones proposed in U.S. Pat. No. 4,585,490 to Raffel et al, assigned to Massachusetts Institute of Technology, and in U.S. Pat. No. 4,960,729 to Orbach et al, assigned to the common assignees of the present invention, for use in integrated circuit devices. U.S. Pat. Nos. 4,585,490 and 4,960,729 are incorporated herein by reference.

However, in the present invention and as described hereinabove, opening 118 is provided in the upper layers 114 and 104 in order to enhance the laser light absorption in the a-Si layer.

The configuration of FIGS. 5A and 5B is particularly advantageous for AMLCD panels whose switches are made of a-Si since no foreign material or process is added to the device.

Figure 6B:
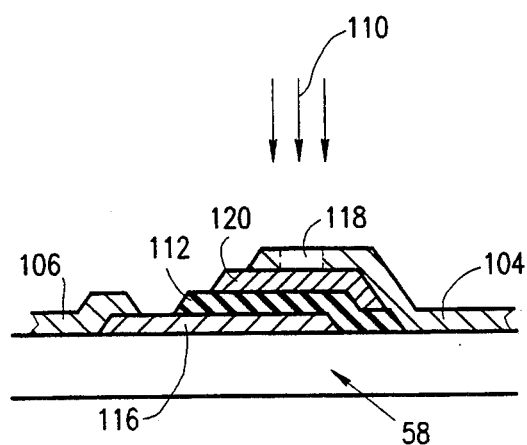
Figure 6A:
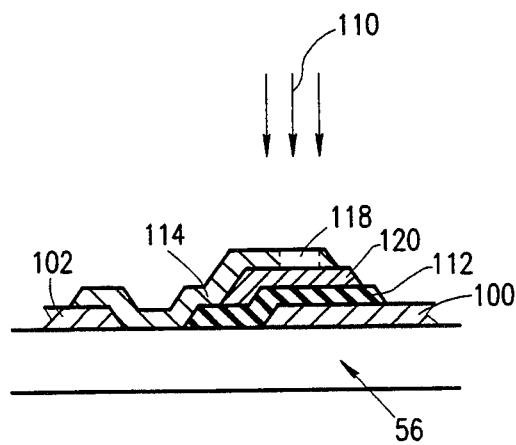

FIGS. 6A and 6B illustrate links 56 and 58, respectively, which are combinations of the links shown in FIGS. 4A-5B. The laser pulse 110 is operative to dissolve both bridging materials 112 and 120. Typically, a laser pulse 110 of 5 to 15 $J/cm^2$ is sufficient to dissolve materials 112 and 120 together.

Figure 7B:
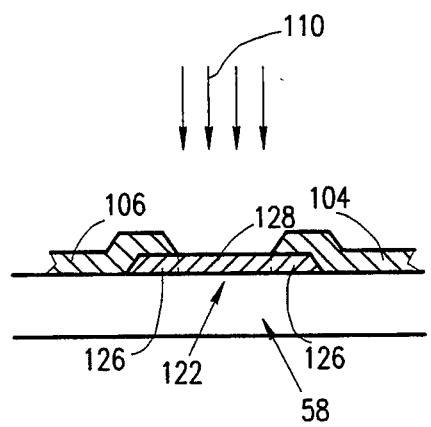
Figure 7A:
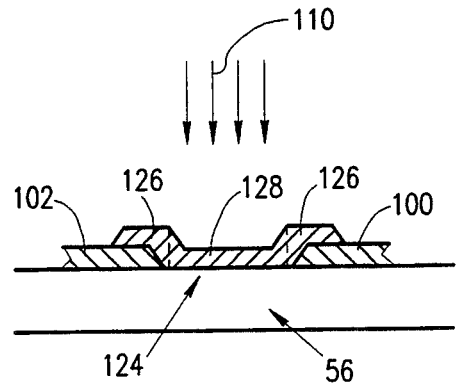

FIGS. 7A and 7B illustrate links 56 and 58, respectively, which are useful for a switch 10 formed of polysilicon. Ion implantation is used to produce a p-n junction in a co-planar 122 (FIG. 7B) or staggered 124 (FIG. 7A) format. The p regions are labeled 126 and the n region is labeled 128. Laser pulse 110 is provided to n regions 128 which causes a charge inversion on the top surface of n regions 128 and switches the link from a permanent close to a permanent open mode. The origin of the charge inversion phenomenon is not yet clear but it is believed to be associated with the creation of traps of the majority carriers of the semiconductor material.

Figure 8A:
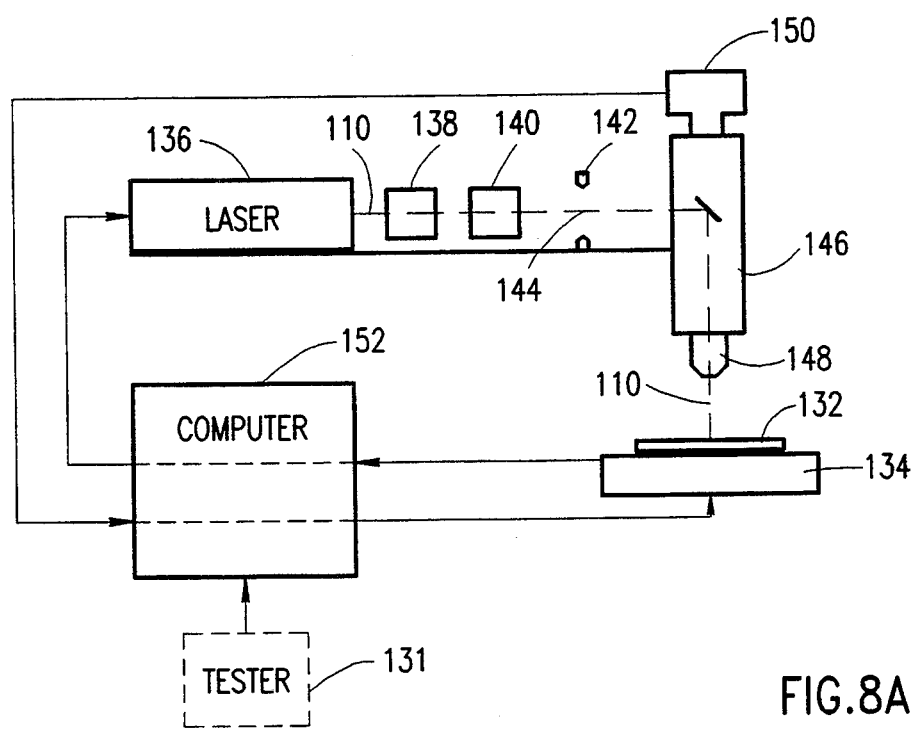
FIG. 8A is a part-block diagram, part schematic illustration of apparatus for repairing an AMLCD panel of the present invention.
Figure 8B:
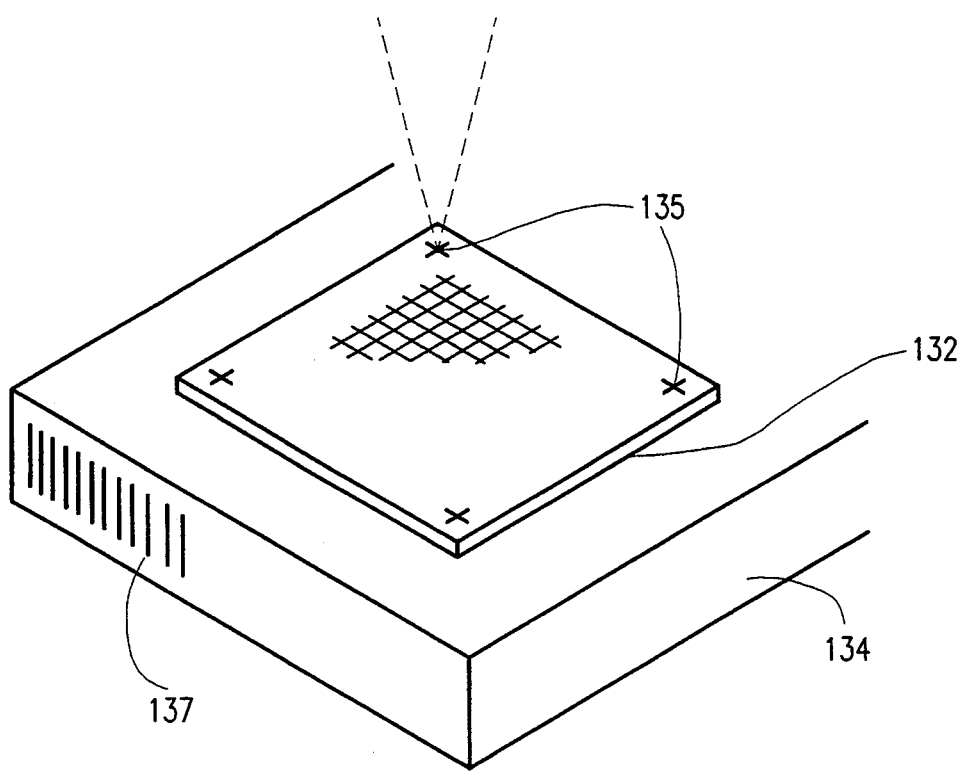
FIG. 8B is a schematic illustration of elements of the apparatus of FIG. 8A.

Reference is now made to FIGS. 8A and 8B which illustrate a repair station 130, constructed and operative in accordance with a preferred embodiment of the present invention. FIG. 8A is a part-block diagram, part schematic illustration and FIG. 8B schematically illustrates some of the elements of the repair station 130.

In accordance with the present invention, after an active matrix panel, labeled 132, is completely finished and encapsulated (i.e. the additional liquid crystal, filter and polarizer layers have been deposited), it is tested, typically by a testing unit 131, and the defective array elements are identified. The panel 132 is then placed on an x-y table 134 included in the repair station 130. The x-y table 134, with panel 132 mounted on it, is detailed in FIG. 8B.

The repair station 130 typically comprises a laser 136, such as a 1.0 W Nd:YAG Q-switched laser, for providing laser pulse 110, an acousto-optic energy modulator 138 and an energy beam sampler 140 for modulating the energy of pulse 110, a diaphragm 142 having an aperture 144 therein, an optical delivery system 146 and an objective lens 148. The diaphragm 142 is typically placed at the back image plane of objective lens 148 so that the laser pulse 110 can be shaped to the right dimensions. The finished panel 132 is typically located at the focal location of pulse 110.

Finished panel 132 typically includes alignment markers 135 (FIG. 8B) which are detectable by a CCD camera 150 (FIG. 8A) and are identifiable by a computer 152. The alignment markers 135 provide an origin to a coordinate system of the panel 132.

The x-y table 134 typically includes position encoding scales 137 (FIG. 8B) with which to align the panel 132 at a desired coordinate location defined with respect to the locations of alignment markers 135. With the help of the alignment markers 135, the CCD camera 150 and the computer 152 together operate to align x and y axes of the panel 132 along the x and y axes of the x-y table 134.

The numerical aperture of the objective may range from 0.3 to 0.6 thereby to provide a relatively small depth of focus only in the vicinity of the fuse or link interface and not at the depths of the other layers. An energy density of 1 to 20 $J/cm^2$ is adequate for any of the link activation or metal fuse cutting applications specified above, with fuse and/or link diameters of typically between 3 and 10 $\mu m$.

Typically, the acousto-optic modulator 138 modulates the energy of the laser pulse 110 to provide high pulse energy for the cutting process and low pulse energy for the linking process.

The repair station 130 can operate in one of two modes. It can repair the panel 132 after defects have been detected on testing unit 131 and their locations provided to computer 152 or it can perform both the detection and the repair. For both modes, the defective switch 32 is not repaired but rather, is cut off from the busses 12 and 14 and a spare switch 34 is connected instead.

In the first mode, the panel 132 is inspected, by tester 131, to determine the defective pixels. This can be done in accordance with a visual method such as voltage imaging, described in the article "Early Detection and Repair of AMLCD Defects", by Francois J. Henley, *Solid State Technology*, Vol. 35 (4), April 1992, p. 65. The article is incorporated herein by reference.

The tester 131 determines the defective pixels and provides information regarding the locations of the defective pixels to the computer 152. The CCD camera 150 is operative just to identify the location of the panel 132 by detecting the locations of the alignment markers 135.

In the second mode, the computer 152 modulates the source and drain voltages of the entirety of pixels of the panel 132. The computer 152 then determines whether or not the CCD camera 150 registered a voltage change indicating that a light went on and off at the prescribed phase and at each pixel location. If not, the pixels which did not operate properly are defective. The computer 152 then indicates to the laser 136 to operate to cut the relevant switches 32 from the busses 12 and 14 and to connect the relevant switches 34 in their stead.

It will be appreciated that the present invention enables the panel 132 to be repaired after the panel 132 has been encapsulated. Since the pixels of panel 132 are transparent to light, the laser pulse 110 can reach the links 56 and 58 and fuses 46 and 48. Since redundancy is manufactured into the panel 132, the panel 132 can be activated according to a predetermined test program and the repair station 130 can detect and repair any defective cells.

It will further be appreciated that the repair operation described hereinabove is not overly time-consuming, as follows. A 1.0 W Nd:YAG laser focused on a spot whose diameter is 5 $\mu m$ typically has sufficient energy to disconnect 2,000,000 defective TFTs and connect instead 2,000,000 other TFTs within 16 seconds. If the x-y table 134 moves at a velocity of 10 cm/sec and there are approximately 100 defects scattered randomly on a AMLCD panel 132 of 20×15 in., then repair station 130 will repair AMLCD panel 132 within approximately 50 seconds.

It will be appreciated by persons skilled in the art that the present invention is not limited to what has been particularly shown and described hereinabove. Rather the scope of the present invention is defined only by the claims which follow:

I claim:

1. An active matrix of a display panel having a plurality of array elements and at least two data busses, each array element comprising:

a primary switch initially connected to said data busses;

at least one connectable secondary switch, wherein, when said primary switch is disconnected from said busses, one of said at least one secondary switches is connected to said busses; and a fuse between said primary switch and each of said data busses; and wherein said at least one secondary switch is connected to said data busses by normally open links; and wherein said links comprise an insulator located between two, partially overlapping, metal branches, and wherein said two metal branches comprise an upper and a lower branch and wherein said upper branch has an opening exposing said insulator.

2. An active matrix according to claim 1 and wherein said fuses and links are deactivated and activated with a laser pulse.

3. An active matrix according to claim 1 and wherein said primary and at least one secondary switches are formed of thin film transistors.

4. An active matrix according to claim 1 and wherein said primary and at least one secondary switches are formed of metal-insulator-metal switches.

5. An active matrix according to claim 1 and wherein said insulator is selected from one of the following group: amorphous silicon, silicon nitride, or a combination of silicon nitride and amorphous silicon.

6. An active matrix according to claim 1 and wherein said links comprise a thin film connecting two metal strips.

7. An active matrix according to claim 6 and wherein said thin film is selected from the following group: polysilicon, amorphous silicon or diamond thin film.

8. An active matrix according to claim 1 which is a fully finished and encapsulated active matrix display.

9. An active matrix of a display panel having a plurality of array elements and at least two data busses, each array element comprising:

a primary switch initially connected to said data busses;

a fuse between said primary switch and each of said data busses; and at least one connectable secondary switch, wherein, when said primary switch is disconnected from said busses, one of said at least one secondary switches is connected to said busses, wherein said at least one secondary switch is connected to said data busses by normally open links, and wherein said links comprise a thin film connecting two metal strips, and wherein said thin film comprises first and second sections of a first polarity between which is a third section of a second polarity, wherein, upon irradiation by a laser, said second polarity of a portion of said third section is changed to said first polarity.

10. An active matrix according to claim 9 which is a fully finished and encapsulated active matrix display.

* * * * *